(12) United States Patent
Umezawa

(10) Patent No.: US 7,890,272 B2
(45) Date of Patent: Feb. 15, 2011

(54) TORQUE MEASUREMENT DEVICE AND PROGRAM

(75) Inventor: Shuichi Umezawa, Tokyo (JP)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 216 days.

(21) Appl. No.: 12/309,277

(22) PCT Filed: Jul. 13, 2006

(86) PCT No.: PCT/JP2006/313941

§ 371 (c)(1),
(2), (4) Date: Jan. 12, 2009

(87) PCT Pub. No.: WO2008/007430

PCT Pub. Date: Jan. 17, 2008

(65) Prior Publication Data

US 2009/0326838 A1    Dec. 31, 2009

(51) Int. Cl.
*G01L 1/00* (2006.01)
(52) U.S. Cl. ....................................................... 702/43
(58) Field of Classification Search ..................... 702/43
See application file for complete search history.

(56) References Cited

U.S. PATENT DOCUMENTS 5,493,921 A * 2/1996 Alasafi et al. ........... 73/862.336

FOREIGN PATENT DOCUMENTS

| JP | 11-214289 | 8/1999 |
|----|-----------|--------|
| JP | 2002-22564 | 1/2002 |
| JP | 2004-20358 | 1/2004 |
| JP | 2005-16950 | 1/2005 |

* cited by examiner

*Primary Examiner*—Aditya Bhat
(74) *Attorney, Agent, or Firm*—Muramatsu & Associates

(57) ABSTRACT

To provide a torque measurement device capable of more accurately specifying positions of reflectors which are attached to a rotating body, and more accurately obtaining a torque of the rotating body.

A pair of reflectors (14$a$, 14$b$) is provided on the surface of the rotating body (13) and has a spacing in the axial direction, reflected light data obtained by reflection of reflection patterns in the pair of reflectors (14$a$, 14$b$) is input and stored, a point of minimizing AIC is determined for a model of the reflected light data from the rotating body (13), and existence regions of the pair of reflectors (14$a$, 14$b$) are detected. Then, a twist amount of the rotating body (13) is calculated from the reflector positions specified by the detected existence regions of the pair of reflectors (14$a$, 14$b$), and the torque is calculated from the calculated twist amount of the rotating body.

4 Claims, 7 Drawing Sheets

[Fig.1]
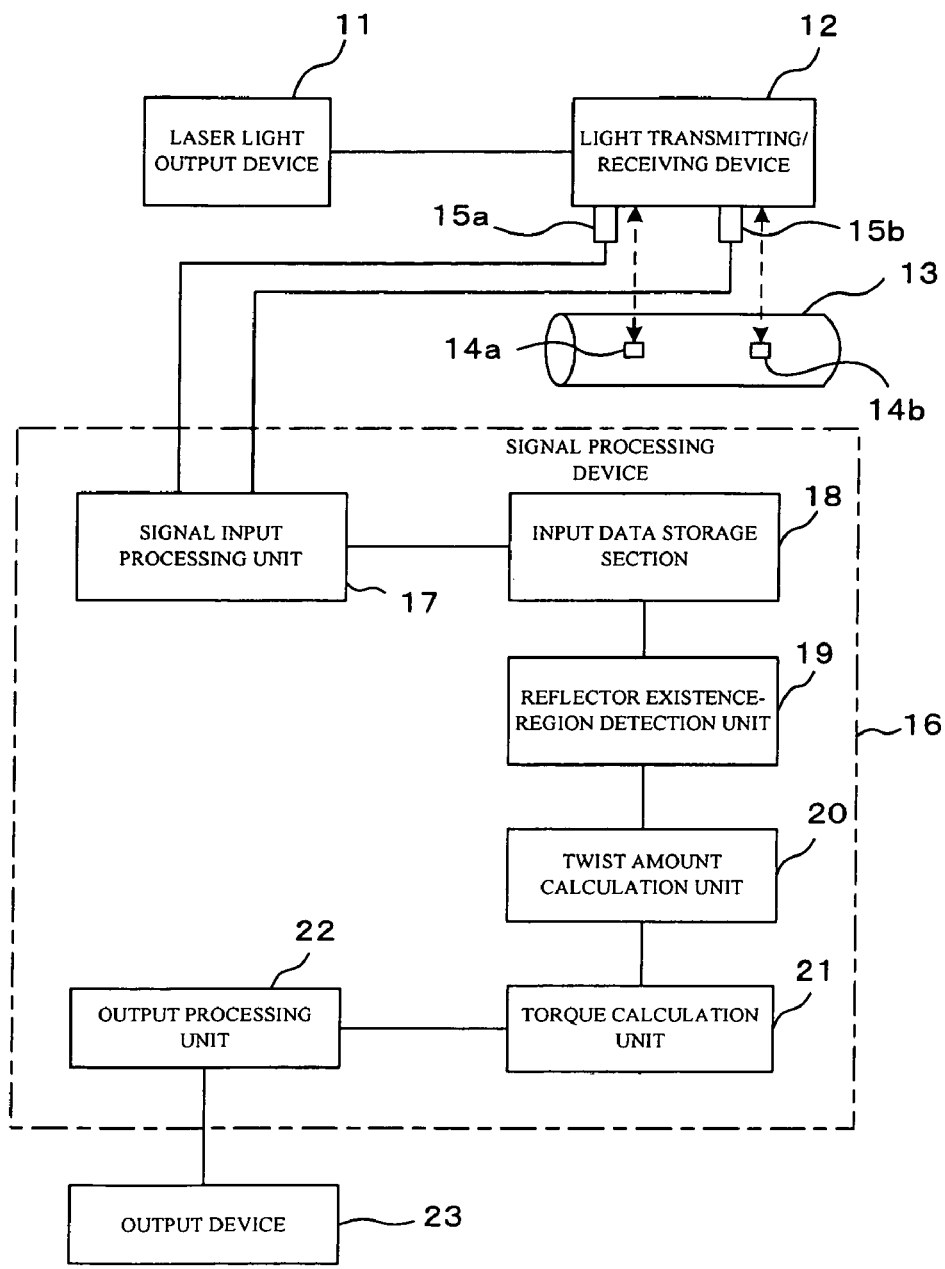

[Fig.2]
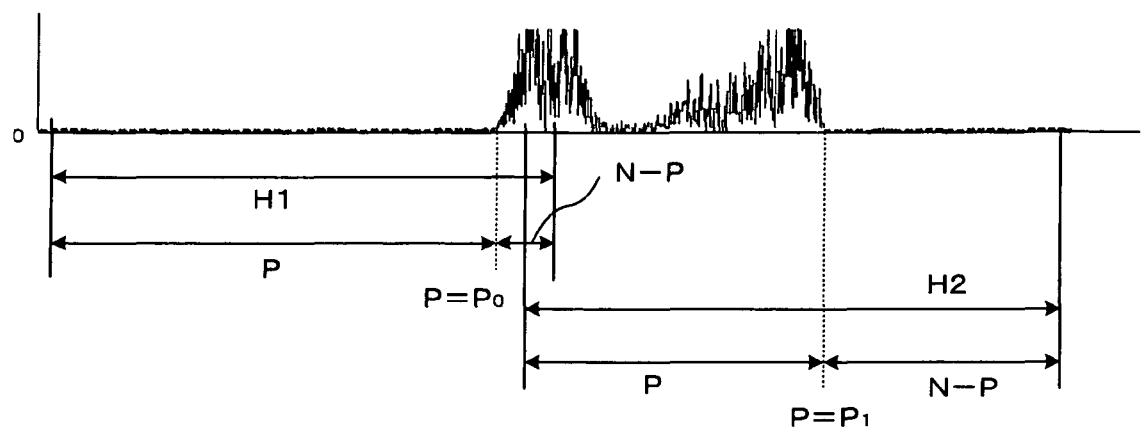
[Fig.3]
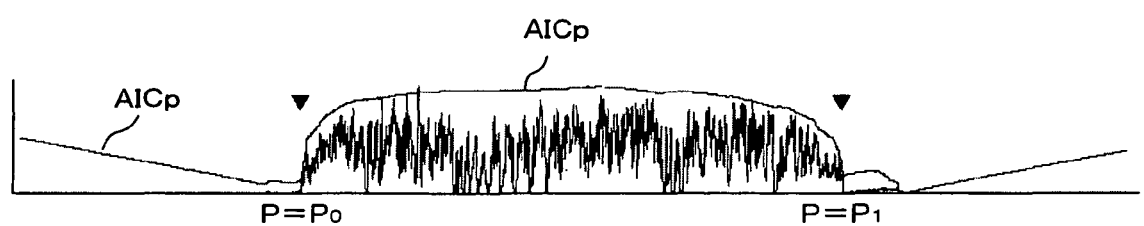

[Fig.4]
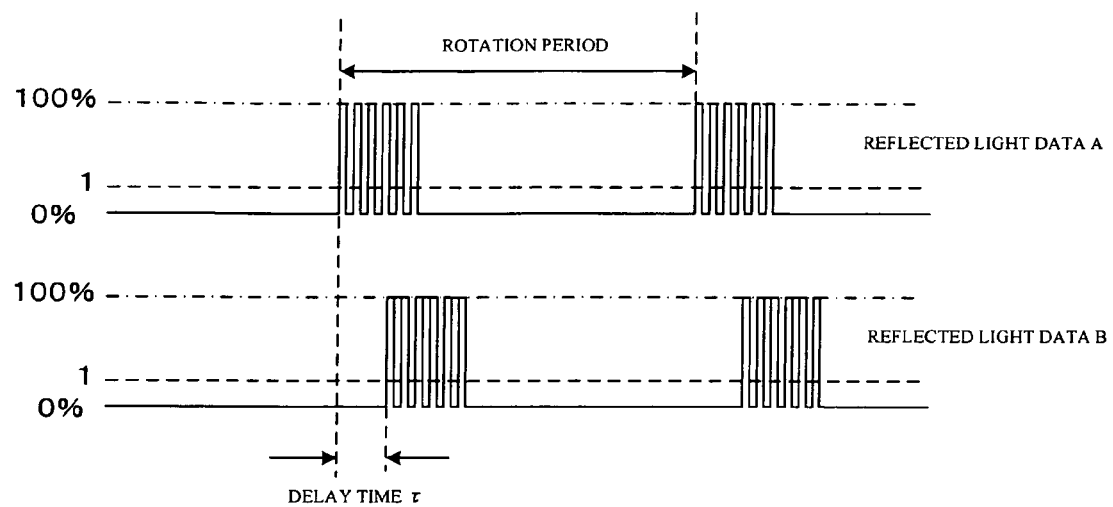

[Fig.5]
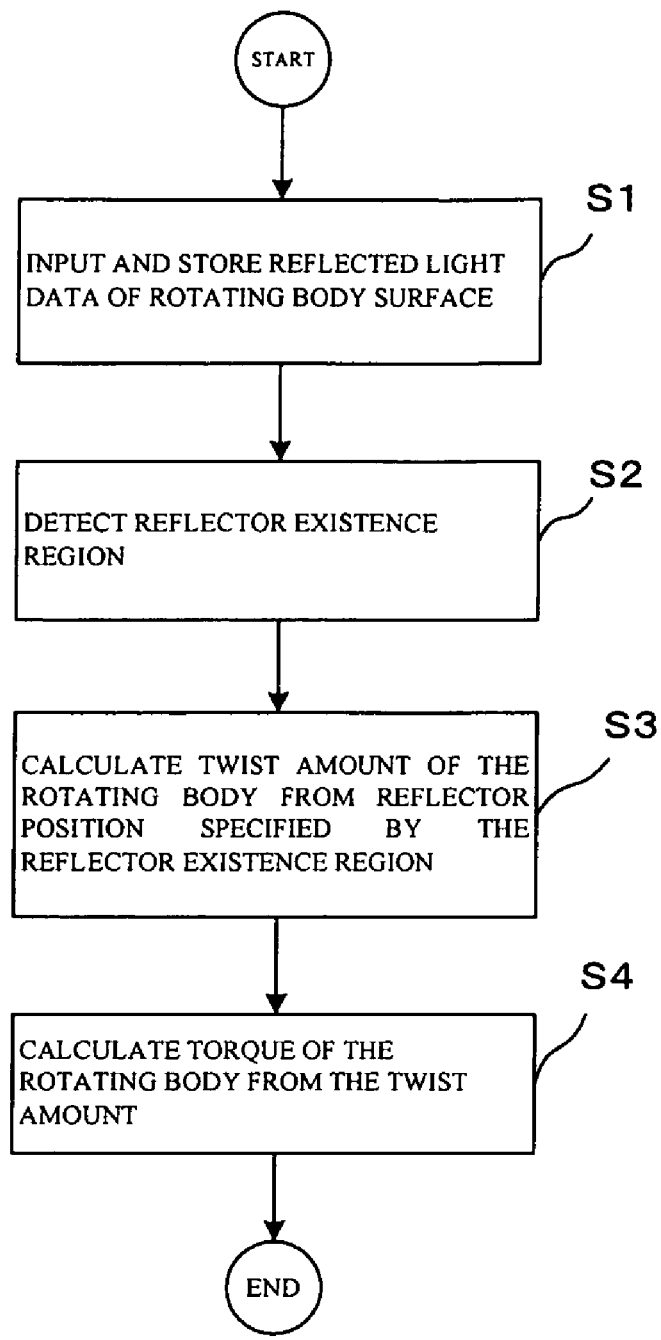

[Fig.6]
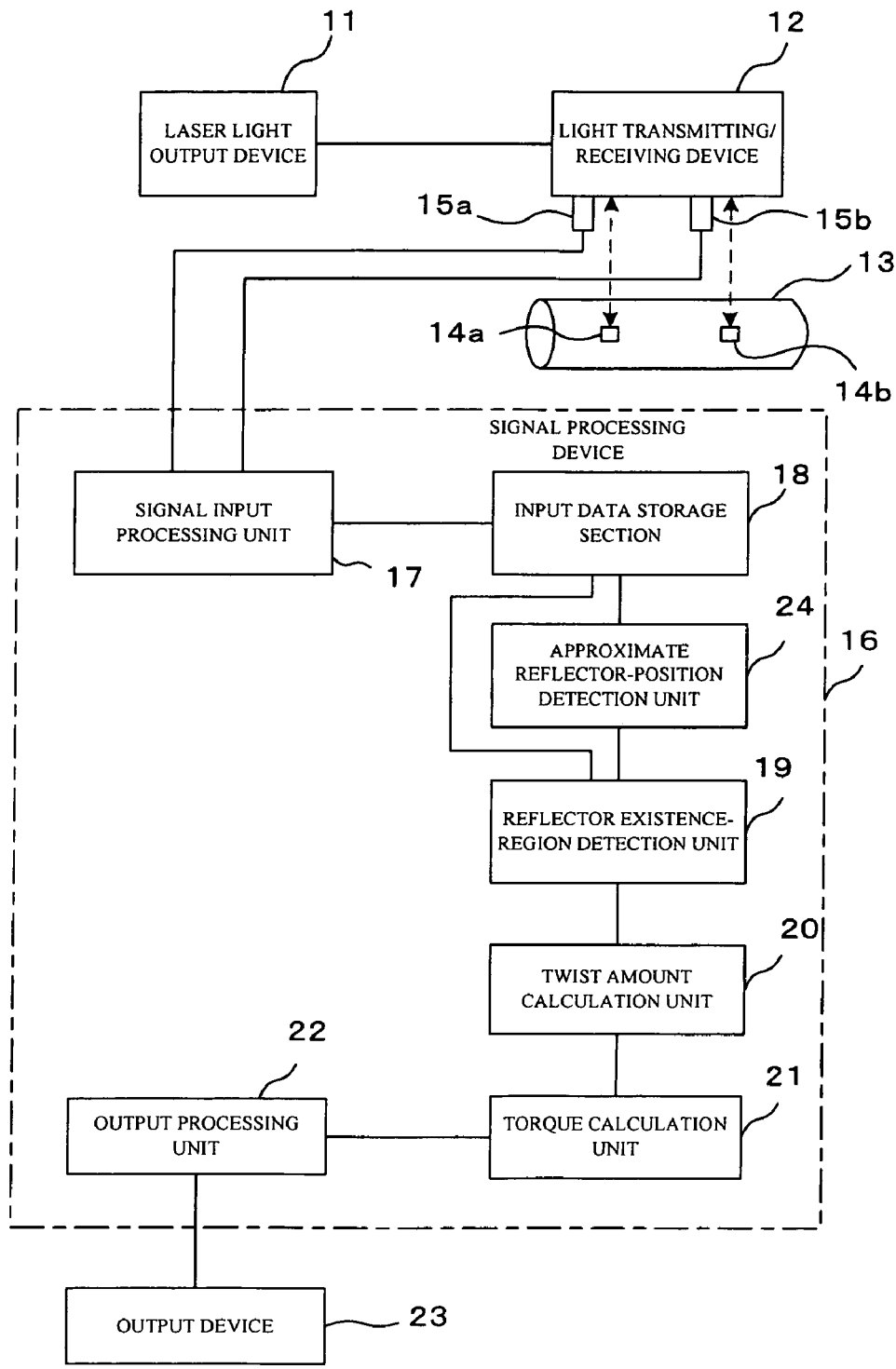

[Fig.7]
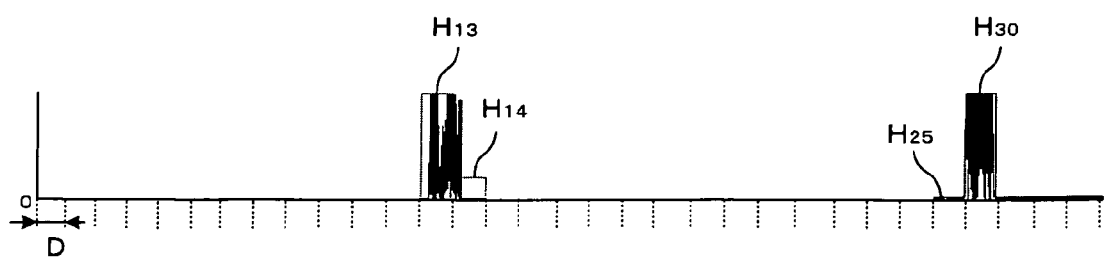
[Fig.8]
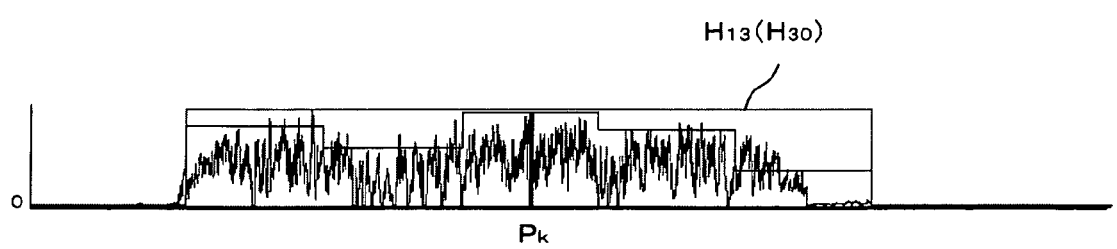

[Fig.9]
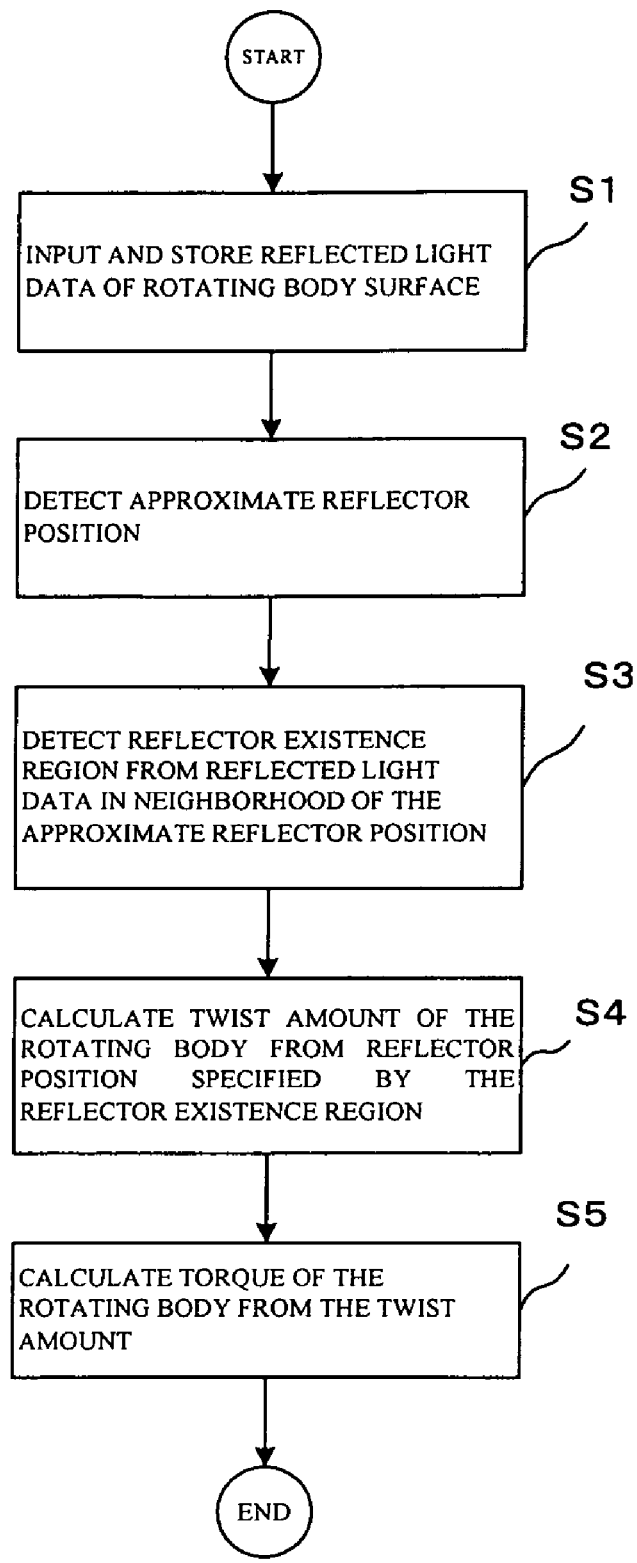

TORQUE MEASUREMENT DEVICE AND PROGRAM

TECHNICAL FIELD

The present invention relates to a torque measurement device and a torque measurement program, which measure a rotating speed and an axial torque of a rotating body optically in a non-contact mode.

BACKGROUND ART

There has been developed an optical torque measurement device for detecting a torque of a drive axis (rotating body) in rotating equipment such as a gas turbine and a steam turbine, for the purpose of identifying a cause of change in a thermal efficiency of a combined-cycle generating plant or a steam turbine plant, for example. This torque measurement device provides a pair of reflectors at different positions on the rotating body in the axial direction thereof, irradiates both of the reflectors with laser light and detects reflected light thereof from both of the reflectors, obtains a rotation period of the rotating body from periodical strong and weak intensities of the reflected light, and detects a torque of the rotating body from a delay time of the reflected light between the reflectors (refer to Patent document 1, for example).

In such a torque measurement device, extraction of the reflected light data necessary for signal processing, yes-no judgment of a processed result in the signal processing, or the like, is operated manually by an analyzer and takes a long time for the analysis job thereof. Accordingly, there is a technique that specifies a reflection pattern position of the reflected light reflected by the reflector, which is provided to the rotating body, automatically using a signal processing device, calculates the rotation period or a twist amount of the rotating body from data within a reflection pattern range determined by the specified reflection pattern position, automatically using the signal processing device, and calculates the torque from the calculated twist amount of the rotating body (refer to Patent document 2, for example).

Patent document 1: Japanese Unexamined Patent Application Publication No. 2002-22564

Patent document 2: Japanese Unexamined Patent Application Publication No. 2005-16950

DISCLOSURE OF THE INVENTION

Problems to be Solved by the Invention

However, when the analyzer manually extracts the reflected light data of the reflectors, which is necessary for the signal processing, the analysis job takes a long time and also the extraction of the reflected light becomes inaccurate, if the reflected light data contains noise.

Further, the technique of Patent document 2 reads the reflected light data of the reflectors on the rotating body, generates a trigger value based on the maximum and minimum values of the read reflected light data, and determines a region having a value exceeding the trigger value to be a reflection pattern region of the reflector. Although the technique can specify the position of the reflector automatically, since calculating the trigger value by multiplying a difference between the maximum and minimum values by a certain ratio, the technique sometimes cannot accurately specify the position of the reflector depending on how to determine the ratio. If the position of the reflector is not accurate, the torque calculated therefrom also has an error.

An object of the present invention is to provide a torque measurement device and a torque measurement program which can more accurately specify the positions of the reflectors attached to the rotating body and can more accurately obtain the torque of the rotating body.

Means for Solving the Problems

The torque measurement device according to a first aspect of the invention is provided with: a laser light output device outputting laser light; a light transmitting/receiving device irradiating a surface of a rotating body with the laser light from the laser light output device and also receiving reflected light thereof; a pair of reflectors which is provided on the surface of the rotating body, having a spacing in an axial direction thereof, and reflects the irradiating laser light from the light transmitting/receiving device in a predetermined reflection pattern; and a signal processing device obtaining a torque of the rotating body from the reflected light received by the light transmitting/receiving device, wherein the signal processing device includes: an input data storage section storing reflected light data of the laser light irradiating the surface of the rotating body, the reflected light data being input according to rotation of the rotating body; a reflector existence-region detection unit detecting existence regions of the pair of reflectors by determining a point which minimizes AIC of a model for the reflected light data of the rotating body, the reflected light data being stored in the input data storage section; a twist amount calculation unit calculating a twist amount of the rotating body from reflector positions which are specified by the existence regions of the pair of reflectors, the existence region being detected by the reflector existence-region detection unit; and a torque calculation unit calculating a torque from a twist amount of the rotating body, the twist amount being calculated by the twist amount calculation unit.

The torque measurement device according to a second aspect of the invention is provided with: a laser light output device outputting laser light; a light transmitting/receiving device irradiating a surface of a rotating body with the laser light from the laser light output device and also receiving reflected light thereof; a pair of reflectors which is provided on the surface of the rotating body, having a spacing in an axial direction thereof, and reflects the irradiating laser light from the light transmitting/receiving device in a predetermined reflection pattern; and a signal processing device obtaining a torque of the rotating body from the reflected light received by the light transmitting/receiving device, wherein the signal processing device includes: an input data storage section storing reflected light data of the laser light irradiating the surface of the rotating body, the reflected light data being input according to rotation of the rotating body; an approximate reflector-position detection unit detecting approximate positions of the pair of reflectors from the reflected light data of the rotating body, the reflected light data being stored in the input data storage section; a reflector existence-region detection unit detecting existence regions of the pair of reflectors by determining a point which minimizes AIC of a model for a pair of the reflected light data in neighborhoods of the approximate reflector positions which are detected by the approximate reflector-position detection unit; a twist amount calculation unit calculating a twist amount of the rotating body from reflector positions which are specified by the existence regions of the pair of reflectors, the existence region being detected by the reflector existence-region detection unit; and a torque calculation unit calculating a torque from a twist amount of the rotating body, the twist amount being calculated by the twist amount calculation unit.

The program according to a third aspect of the invention enables a computer to carry out a method including the steps of: inputting and storing reflected light data obtained by reflection of reflection patterns in a pair of reflectors which is provided on a surface of a rotating body and has a spacing in an axial direction thereof; detecting existence regions of the pair of reflectors by determining a point which minimizes AIC of a model for the reflected light data of the rotating body; calculating a twist amount of the rotating body from reflector positions specified by the detected existence regions of the pair of reflectors; and calculating a torque from the calculated twist amount of the rotating body.

The program according to a fourth aspect of the invention enables a computer to carry out a method including the steps of: inputting and storing reflected light data obtained by reflection of reflection patterns in a pair of reflectors which is provided on a surface of a rotating body and has a spacing in an axial direction thereof; detecting approximate positions of the pair of reflectors from the reflected light data of the rotating body; detecting existence regions of the pair of reflectors by determining a point which minimizing AIC of a model for the reflected light data in neighborhoods of the detected approximate positions of the pair of reflectors; calculating a twist amount of the rotating body from reflector positions specified by the detected existence regions of the pair of reflectors and calculating a torque from the calculated twist amount of the rotating body.

Advantages of the Invention

The present invention detects the existence region of the pair of reflectors by determining the point which minimizes AIC of the model for the reflected light data of the rotating body, which is obtained by the reflection of the pair of reflectors provided on the surface of the rotating body having the spacing in the axial direction, and thereby a detection accuracy of the reflector positions is improved. Therefore, an accuracy of the torque calculated from the reflector positions is improved.

Further, the present invention detects the approximate positions of the pair of reflectors by the reflected light data of the rotating body and detects the existence region of the pair of reflectors by determining the point which minimizes AIC of the model for the reflected light data in the neighborhoods of the approximate positions of the pair of reflectors, and thereby it is possible to detect the reflector positions quickly and also accurately.

BRIEF DESCRIPTION OF THE DRAWINGS

FIG. 1 is a block configuration diagram of a torque measurement device according to a first embodiment of the present invention.

FIG. 2 is an explanatory diagram of an AICp calculation range of a model for reflected light data in the first embodiment of the present invention.

FIG. 3 is an explanatory diagram of an AICp calculation result of the model for the reflected light data in the first embodiment of the present invention.

FIG. 4 is an explanatory diagram of the reflected light data obtained from a pair of reflectors in the first embodiment of the present invention.

FIG. 5 is a flowchart showing a torque measurement method measuring a torque using the torque measurement device according to the first embodiment of the present invention.

FIG. 6 is a block configuration diagram of a torque measurement device according to a second embodiment of the present invention.

FIG. 7 is an explanatory diagram of range average processing in an approximate reflector-position detection unit in the second embodiment of the present invention.

FIG. 8 is an explanatory diagram of approximate reflector-position detection processing in the approximate reflector-position detection unit of the second embodiment of the present invention.

FIG. 9 is a flowchart showing a torque measurement method measuring a torque using the torque measurement device according to the second embodiment of the present invention.

DESCRIPTION OF THE SYMBOLS

11: Laser light output device, 12: Light transmitting/receiving device, 13: Rotating body, 15: Light detection device, 16: Signal processing device, 17: Signal input processing unit, 18: Input data storage section, 19: Reflector existence-region detection unit, 20: Twist amount calculation unit, 21: Torque calculation unit, 22: Output processing unit, 23: Output device, 24: Approximate reflector-position detection unit

BEST MODES FOR CARRYING OUT THE INVENTION

First Embodiment

FIG. 1 is a block configuration diagram of a torque measurement device according to a first embodiment of the present invention. Laser light output from a laser light output device 11 irradiates the surface of a rotating body 13 via a light transmitting/receiving device 12. A pair of reflectors 14*a* and 14*b* is provided on the surface of the rotating body 13, having a spacing in the axial direction, and reflects the irradiating laser light from the light transmitting/receiving device 12 in a predetermined reflection pattern. Each of the reflectors 14*a* and 14*b* has a reflection pattern which is formed in a bar-code pattern having a portion reflecting the laser light and a portion absorbing the laser light, for example, and generates reflected light according to the reflection pattern when irradiated by the laser light. The reflected light reflected on the surface of the rotating body 13 including the reflectors 14*a* and 14*b* is received by the light transmitting/receiving device 12, and reflection intensity thereof is detected by light detection devices 15*a* and 15*b* and input into a signal input processing unit 17 of a signal processing device 16. In the following description, there will be described a case in which one set of the pair of reflectors 14*a* and 14*b* is provided around the rotating body 13.

The signal processing device 16 obtains a rotation period and a twist amount of the rotating body 13 using the reflected light reflected by the pair of reflectors 14*a* and 14*b* within the reflected light reflected by the surface of the rotating body 13, and further obtains a torque. The signal input processing unit 17 of the signal processing device 16 carries out filtering processing, for example, of the input reflected light data of the rotating body 13 and stores the reflected light data in each rotation of the rotating body 13 into an input data storage section 18 for a predetermined number of rotations.

A reflector existence-region detection unit 19 detects existence regions of the pair of reflectors 14*a* and 14*b* from the reflected light data of the rotating body stored in an input data storage section 18; inputs the reflected light data of the rotating body 13 stored in the input data storage section 18 sequentially in a time series and specifies positions of the reflectors 14a and 14b in real time using an arithmetic method to be described hereinafter.

The reflector positions specified by the reflector existence-region detection unit 19 are input into a twist amount calculation unit 20. The twist amount calculation unit 20 calculates a twist amount of the rotating body 13 in real time from the specified reflector positions. The twist amount of the rotating body 13 calculated by the twist amount calculation unit 20 is input into a torque calculation unit 21, and the torque calculation unit 21 calculates a torque of the rotating body 13 in real time from the twist amount of the rotating body calculated by the twist amount calculation unit 20. The torque of the rotating body 13 calculated by the torque calculation unit 21 is provided with output processing in an output processing unit 22 and output to outside from the signal processing device 16. FIG. 1 shows a case of outputting to an output device 23.

Next, the arithmetic method, which calculates the existence region of the reflector in the reflector existence-region detection unit 19, will be described. Waveform data stored in the input data storage section 18 for the reflected light data of the rotating body is composed of waveform data in a region where the reflection pattern of the reflector 14a or 14b exists and waveform data in a region where the reflection pattern does not exists, which regions have different characteristics.

Accordingly, there are assumed two waveform data models for the reflected light data stored in the input data storage section 18; a waveform data model M1 which does not have the reflected light pattern of the reflector 14a or 14b and a waveform data model M2 in the region where the reflection pattern exists. Then, AIC (Akaike's Information Criterion) is obtained for a reflected light data model M including the model M1 and the model M2, and a point which minimizes AIC of the reflected light data model M is determined for detecting the existence regions of the pair of reflectors 14a and 14b. That is, a starting position and an ending position for each of the reflectors 14a and 14b are detected, and the existence regions of the pair of reflectors 14a and 14b are detected.

Here, AIC is expressed by the following formula (1). L is a maximum likelihood and log(L) is a maximum logarithm likelihood.

[Formula 1]

$$AIC = -2 \times \log(L) + 2 \times (\text{Number of parameters}) \quad (1)$$

Now, both of the waveform data model M1 for the region without the reflector pattern and the waveform data model M2 for the region with the reflector pattern utilize the range average values for the models. Then, the range average value of the model M1 is nearly zero, and the range average value of the model M1 is a value corresponding to a reflected light level of the reflection pattern. Therefore, focusing on the reflected light data model M including the model M1 and the model M2, a point for the best fitting of the reflected light data model M is a boundary point between the model M1 and the model M2. That is, the point of minimizing AIC is determined for the reflected light data model M and the starting point and the ending point for each of the pair of reflectors 14a and 14b are detected, and then the existence regions of the pair of reflectors 14a and 14b are detected.

From the above, the reflected light data model M is divided into two models Ma and Mb hypothetically, and the maximum likelihood La of the model Ma is assumed to be expressed by Formula (2-1) and the maximum likelihood Lb of the model Mb is assumed to be expressed by Formula (2-2).

[Formula 2]

$$L_a = \left(\frac{1}{\sqrt{2\pi}}\right)^N (\sigma_a^2)^{-\frac{N}{2}} e^{-\frac{N}{2}} \quad (2\text{-}1)$$

$$L_b = \left(\frac{1}{\sqrt{2\pi}}\right)^N (\sigma_b^2)^{-\frac{N}{2}} e^{-\frac{N}{2}} \quad (2\text{-}2)$$

N is the number of object ranges, e is a base of a logarithm, $d_a^2$ is a dispersion of the waveform data in the region without the reflection pattern, $d_b^2$ is a dispersion of the waveform data in the region with the reflection pattern, and the dispersion $d_a^2$ is expressed by Formula (3-1) and the dispersion $d_b^2$ is expressed by Formula (3-2).

[Formula 3]

$$\sigma_a^2(p) = \frac{1}{p} \sum_{j=0}^{p} (x_j - \overline{x}_a)^2 \quad (3\text{-}1)$$

p is a parameter, and $\overline{x}_a$ is a range average value.

$$\sigma_b^2(p) = \frac{1}{N-p-1} \sum_{j=p+1}^{N} (x_j - \overline{x}_b)^2 \quad (3\text{-}2)$$

p is a parameter, $\overline{x}_b$ is a range average value, and N is the number of data sets.

Next, Formula (2-1) is substituted into Formula (1), and Formula (4-1) is obtained for calculating AICa of the model Ma. In this case, the parameter is only p and the number of parameters becomes 1. Similarly, Formula (2-2) is substituted into Formula (1) and 1 is substituted for the number of parameters, and then Formula (4-2) is obtained for calculating AICb of the model Mb.

[Formula 4]

$$AIC_a = \{(p+1)(\log(2\pi\sigma_a^2)+1)+2\} \quad (4\text{-}1)$$

$$AIC_b = \{(N-p)(\log(2\pi\sigma_b^2)+1)+2\} \quad (4\text{-}2)$$

Then, AICp for the reflected light data model M is obtained as a sum of AICa and AICb as shown in Formula (5).

[Formula 5]

$$AIC_p = AIC_a + AIC_b \quad (5)$$
$$= \left\{ \frac{(p+1)}{(\log(2\pi\sigma_a^2)+1)+2} \right\} + \left\{ \frac{(N-p)}{(\log(2\pi\sigma_b^2)+1)+2} \right\}$$

FIG. 2 is an explanatory diagram of a calculation range of AICp. For example, an AICp value expressed by Formula (5) is obtained by changing the parameter p for the number of data sets N in the object range H1 of the reflected light data. When the object range H1 includes the starting position ($p=p_0$) of the reflection pattern of the reflector, the AICp value becomes smaller gradually and increases abruptly from a minimum value, as the parameter p increases, as shown in FIG. 3. The position of this minimum value ($p=p_0$) is the starting position of the reflector.

On the other hand, when the object range H2 includes the ending position ($p=p_{01}$) of the reflection pattern of the reflector as shown in FIG. 2, the AICp value becomes smaller gradually and reduces abruptly to be a minimum value, and then becomes larger gradually, as the parameter p increases, as shown in FIG. 3. The position of this minimum value ($p=p_1$) is the ending position of the reflector.

In this manner, for detecting the existence positions of the reflectors 14a and 14b, the reflector existence-region detection unit 19 changes the AICp parameter p for the reflected light data in the object range as shown in FIG. 2 and detects the point for the best fitting of the reflected light data model M to be a boundary point between the region with the reflector pattern and the region without the reflector pattern, as shown in FIG. 3. Accordingly, the positions of the reflectors 14a and 14b are detected as the starting points and the ending points, respectively, and thereby it is possible to detect the reflector positions accurately.

Next, a calculation method of the twist amount of the rotating body 13 in the twist amount calculation unit 21 will be described. The reflected light data at the reflector position specified by the reflector position specification unit 20 shows a reflection pattern where a strong intensity and a weak intensity are repeated periodically for each rotation of the rotating body 13 as shown in FIG. 4. The upper part of FIG. 4 shows the reflected light data A of the reflector 14a, one of the pair of reflectors 14a and 14b, and the lower part thereof shows the reflected light data B of the other reflector 14b. The delay time t of the reflection pattern in the reflected light data B against the reflection pattern in the reflected light data A shows that the twist amount is generated in the rotating body 13.

The twist amount calculation unit 21 first obtains the rotation period of the rotating body 13 from a correlation function of the reflected light data A. Now, a function F(t) is extracted from the reflected light data A, and then the correlation function f(t) of the reflected light data A is expressed by Formula (6). C is a shift time of a detected signal, t is the delay time, and d is a reflection pattern width of the reflected light data A.

[Formula 6]

$$\Phi i(\tau) = (1/2\delta) \sum_{t=C-\delta}^{t=C+\delta} F(t+\tau)F(t) \qquad (6)$$

The delay time, which maximizes this correlation function f(t), is obtained. This calculation corresponds to an operation for checking overlap between the first detection signal (reflection pattern) and the next detection signal (reflection pattern) by delaying the first detection signal temporally in the reflected light data A, and, when the delay time t becomes close to the rotation period, the first detection signal becomes to coincide with the next detection signal and the value of the correlation function f(t) becomes large. The delay time t at this point becomes the rotation period. This rotation period can be obtained from the reflected light data B as well as the reflected light data A.

Meanwhile, the twist amount of the rotating body 13 is obtained from a correlation function fi(t) between the reflected light data A and the reflected light data B. Now, a function G1(t) is extracted from the output signal of the reflected light data A and a function G2(t) is extracted from the output signal of the second detection signal, and then the correlation function fi(t) is expressed by Formula (7). Ci is a shift time of the detection signal of the reflected light data A, t is a delay time between the reflected light data A and the reflected light data B, and di is a reflection pattern width of the reflected light data A.

[Formula 7]

$$\Phi i(\tau) = (1/2\delta) \sum_{t=Ci-\delta i}^{t=Ci+\delta i} G_1(t)G_2(t+\tau) \qquad (7)$$

The delay time, which maximizes this correlation function fi(t), is obtained. This calculation corresponds to an operation for checking overlap between the detection signal (reflection pattern) of the reflected light data A and the detection signal (reflection pattern) of the reflected light data B by delaying the detection signal of the reflected light data A. The delay time t maximizing the correlation function fi(t) corresponds to the twist amount of a drive axis in the rotating body 13.

Next, a calculation method for the torque of the rotating body 13 in the torque calculation unit 22 will be described. The torque calculation unit 22 calculates the torque Ft of the rotating body 13 from the twist amount (delay time) obtained by the twist calculation unit 21. The torque Ft of the rotating body 13 is obtained by Formula (6). K is a torsion spring constant of the drive axis in the rotating body 13, x is a distance between the reflector 14a and the reflector 14b, and T is a rotation period of the rotating body 13.

[Formula 8]

$$Ft = 2pKx \cdot t/T \qquad (8)$$

FIG. 5 is a flowchart of the torque measurement method measuring the torque using the torque measurement device according to the first embodiment of the present invention. First, the reflected light data of the laser light irradiating the surface of the rotating body 13 is input, and the reflected light data is stored for a predetermined number of rotations of the rotating body 13 (S1). Then, the existence regions are detected for the pair of reflectors 14a and 14b, which are provided on the surface of the rotating body 13 and has the spacing in the axial direction, from the reflected light data of the rotating body 13 (S2), and the twist amount of the rotating body 13 is calculated from the reflector positions specified by the existence regions of the pair of reflectors 14a and 14b (S3). Then the torque is calculated from the calculated twist amount of the rotating body (S4).

According to the first embodiment, the existence regions of the reflectors 14a and 14b are detected and the reflector positions are specified by the starting positions and the ending positions of the reflectors, and thereby the accuracy of the reflector position is improved. Further, the twist amount of the rotating body 13 is calculated from the reflector positions and then the torque of the rotating body 13 is calculated, and thereby the accuracy of the torque is improved. Moreover, these processing can be carried out in real time, and thereby the calculated torque of the rotating body can be used for real-time monitoring control.

Second Embodiment

FIG. 6 is a block configuration diagram of a torque measurement device according to a second embodiment of the present invention. This second embodiment provides an approximate reflector-position detection unit 24 added to the first embodiment shown in FIG. 1 for detecting approximate positions of the pair of reflectors 14a and 14b using the reflected light data of the rotating body 13 stored in the input data storage section 18, and the reflector existence-region detection unit 19 specifies the reflector positions by detecting the existence regions of the pair of reflectors 14a and 14b from the reflected light data in the neighborhoods of the approximate positions of the pair of reflectors 14a and 14b, which are detected by the approximate reflector-position detection unit 24. The same element as that in FIG. 1 is denoted by the same symbol and repeated explanation will be omitted.

The approximate reflector-position detection unit 24 inputs the reflected light data of the rotating body 13, which is stored in the input data storage section 18, and detects the approximate reflector positions of the pair of reflectors 14a and 14b from the reflected light data of the rotating body 13. The approximate reflector-position detection unit 24 carries out an arithmetic method of detecting the approximate reflector positions as follows. First, the whole measured waveform in the reflected light data of the rotating body 13 is divided into small ranges having a range width D as shown in FIG. 7. Then, an average value $H_k$ of an amplitude value $x_k$ in the measured waveform is calculated for each of the ranges as shown in Formula (9). The divided range width D (D=2m) is determined to have approximately the same size as a single piece size of the reflectors 14, for example.

[Formula 9]

$$H_k = \frac{1}{2m} \sum_{j=-m}^{j=m} x_{k+j} \qquad (9)$$

The reflected light data in the region of the reflector 14a or 14b shows a larger amplitude value than amplitude values of the peripheral regions thereof, and shows the larger range average value than the average values of the peripheral ranges. Accordingly, a local maximum position of the range average value $H_k$ in the small range is obtained sequentially, and the local maximum position of the range average value $H_k$, which is larger than a predetermined value, is determined to be the approximated reflector position. For example, in FIG. 7, since the range average values $H_{13}$ and $H_{30}$ are larger than the range average values of the peripheral ranges and also larger than the predetermined value, the local maximum positions of the range average values $H_{13}$ and $H_{30}$ are determined to be the approximate reflector positions. For the local maximum position of the range average value Hk, as shown in FIG. 8, the range is divided further into a plurality of smaller ranges and a position $P_k$, which provides a local maximum of the smaller range average value, is determined to be the approximate position of the reflectors 14a or 14b.

The reflector existence-region detection unit 19 inputs the reflected light data in the neighborhood of the approximate positions of the pair of reflectors 14a and 14b, which are detected by the approximate reflector-position detection unit 24, from the input data storage section 18, and detects and specifies the existence regions of the pair of reflectors 14a and 14b in real time from the reflected light data in the neighborhoods of the approximate positions of the pair of reflectors 14a and 14b, using the arithmetic method described in the first embodiment.

The reflector positions of the pair of reflectors 14a and 14b specified by the reflector existence-region detection unit 19 are input into the twist amount calculation unit 20, and the twist amount of the rotating body 13 is calculated in real time.

The twist amount of the rotating body calculated by the twist amount calculation unit 20 is input into the torque calculation unit 21 and the torque of the rotating body 13 is calculated in real time. The torque of the rotating body 13 calculated by the torque calculation unit 21 is provided with the output processing by the output processing unit 22 and output to outside from the signal processing device 16.

FIG. 9 is a flowchart showing the torque measurement method measuring the torque using the torque measurement device according to the second embodiment of the present invention. First, the reflected light data of the laser light irradiating the surface of the rotating body 13 is input, and the reflected light data is stored for a predetermined number of rotations of the rotating body 13 (S1). Then, the approximate positions are detected for the pair of reflectors 14a and 14b, which are provided on the surface of the rotating body 13 and has the spacing in the axial direction, from the reflected light data of the rotating body 13 (S2), and the existence regions of the pair of reflectors 14a and 14b are detected from the reflected light data in the neighborhoods of the approximate reflector positions (S3), and then the twist amount of the rotating body 13 is calculated from the reflector positions specified by the existence regions of the pair of reflectors 14a and 14b (S4). Finally, the torque is calculated from the calculated twist amount of the rotating body (S5).

According to the second embodiment, the reflector position specification unit 20 carries out the detection processing for the existence regions of the reflectors 14a and 14b only from the reflected light data in the neighborhoods of the approximate positions of the reflectors 14a and 14b, and thereby does not need to carry out the detection processing for the existence regions of the reflectors 14a and 14b from the whole reflected light data as in the first embodiment. Therefore, the second embodiment has an advantage of further reducing the detection processing of the reflector positions in addition to the advantage of the first embodiment.

Here, the method described in each of the foregoing embodiments can be applied to each device as a computer-executable program stored in a storage medium, or can be applied to each device as a computer-executable program transmitted via a communication medium.

The storage media for the present invention include such as a magnetic disk, a flexible disk, an optical disk (CD-ROM, CD-R, DVD, etc.) a magneto-optical disk (MO and the like), a semiconductor memory, etc., and storage format thereof may be any type as far as the storage medium is a program-storable and computer-readable storage medium. Further, the storage media here are not limited to the media independent from a computer and include a storage medium storing or temporarily storing a program which is transmitted and downloaded via a LAN or the Internet.

The invention claimed is:

1. A torque measurement device provided with: a laser light output device outputting laser light; a light transmitting/receiving device irradiating a surface of a rotating body with the laser light from the laser light output device and also receiving reflected light thereof; a pair of reflectors which is provided on the surface of the rotating body, having a spacing in an axial direction thereof and reflects the irradiating laser light from the light transmitting/receiving device in a predetermined reflection pattern; and a signal processing device obtaining a torque of the rotating body from the reflected light received by the light transmitting/receiving device, the signal processing device, comprising:

an input data storage section storing reflected light data of the laser light irradiating the surface of the rotating body, the reflected light data being input according to rotation of the rotating body;

a reflector existence-region detection unit detecting existence regions of the pair of reflectors by determining a point which minimizes AIC (Akaike's information criterion) of a model for the reflected light data of the rotating body, the reflected light data being stored in the input data storage section;

a twist amount calculation unit calculating a twist amount of the rotating body from reflector positions which are specified by the existence regions of the pair of reflectors, the existence regions being detected by the reflector existence-region detection unit; and a torque calculation unit calculating a torque from the twist amount of the rotating body, the twist amount being calculated by the twist amount calculation unit.

2. A torque measurement device provided with: a laser light output device outputting laser light; a light transmitting/receiving device irradiating a surface of a rotating body with the laser light from the laser light output device and also receiving reflected light thereof; a pair of reflectors which is provided on the surface of the rotating body, having a spacing in an axial direction thereof and reflects the irradiating laser light from the light transmitting/receiving device in a predetermined reflection pattern; and a signal processing device obtaining a torque of the rotating body from the reflected light received by the light transmitting/receiving device, the signal processing device, comprising:

an input data storage section storing reflected light data of the laser light irradiating the surface of the rotating body, the reflected light data being input according to rotation of the rotating body;

an approximate reflector-position detection unit detecting approximate positions of the pair of reflectors from the reflected light data of the rotating body, the reflected light data being stored in the input data storage section;

a reflector existence-region detection unit detecting existence regions of the pair of reflectors by determining a point which minimizes AIC (Akaike's information criterion) of a model for the pair of reflected light data in neighborhoods of the approximate reflector positions which are detected by the approximate reflector-position detection unit;

a twist amount calculation unit calculating a twist amount of the rotating body from reflector positions which are specified by the existence regions of the pair of reflectors, the existence regions being detected by the reflector existence-region detection unit; and a torque calculation unit calculating a torque from the twist amount of the rotating body, the twist amount being calculated by the twist amount calculation unit.

3. A non-transitory computer readable medium containing computer instructions stored therein for causing a computer processor to perform the method steps of:

inputting and storing reflected light data obtained by reflection of reflection patterns in a pair of reflectors which is provided on a surface of a rotating body and has a spacing in an axial direction thereof;

detecting existence regions of the pair of reflectors by determining a point which minimizes AIC (Akaike's information criterion) of a model for the reflected light data of the rotating body;

calculating a twist amount of the rotating body from reflector positions specified by the detected existence regions of the pair of reflectors; and calculating a torque from the calculated twist amount of the rotating body.

4. A non-transitory computer readable medium containing computer instructions stored therein for causing a computer processor to perform the method steps of:

inputting and storing reflected light data obtained by reflection of reflection patterns in a pair of reflectors which is provided on a surface of a rotating body and has a spacing in an axial direction thereof;

detecting approximate positions of the pair of reflectors from the reflected light data of the rotating body;

detecting existence regions of the pair of reflectors by determining a point which minimizes AIC (Akaike's information criterion) of a model for the reflected light data in neighborhoods of the detected approximate positions of the pair of reflectors;

calculating a twist amount of the rotating body from reflector positions specified by the detected existence regions of the pair of reflectors; and calculating a torque from the calculated twist amount of the rotating body.

* * * * *